United States Patent [19]
MacDonald et al.

[11] Patent Number: 5,809,606
[45] Date of Patent: Sep. 22, 1998

[54] WHEEL CLEANING COVER

[76] Inventors: Christopher John MacDonald, Flat 16, 32-34 Alhion Road, Sutton, Surrey, England, SM2 5TF; Graham Andrew MacDonald, 7 Pannal Ash Road, Harrogate, North Yorkshire, England, HG2 9AA; Stewart Thomas MacDonald, 29 Wayside Crescent, Harogate, North Yorkshire, England, HG2 DN3

[21] Appl. No.: 793,720
[22] PCT Filed: Mar. 2, 1995
[86] PCT No.: PCT/GB95/00441
§ 371 Date: Mar. 3, 1997
§ 102(e) Date: Mar. 3, 1997
[87] PCT Pub. No.: WO96/07553
PCT Pub. Date: Mar. 14, 1996

[30] Foreign Application Priority Data

Sep. 5, 1994 [GB] United Kingdom ................... 9417817

[51] Int. Cl.⁶ ....................................................... A46B 9/00
[52] U.S. Cl. ............................... 15/160; 15/246; 220/4.24
[58] Field of Search ................................. 220/4.22, 4.23, 220/4.24; 206/303, 304, 445, 403; 15/256.6, 160, 53.4, 246

[56] References Cited

U.S. PATENT DOCUMENTS

| | | |
|---|---|---|
| 617,397 | 1/1899 | Hoyt ........................................ 15/160 |
| 946,370 | 1/1910 | Relmel ..................................... 15/160 |
| 1,629,777 | 5/1927 | Dahl ........................................ 206/304 |
| 1,838,702 | 12/1931 | Partridge ................................. 220/4.22 |
| 1,846,134 | 2/1932 | McCormick ............................. 206/304 |
| 2,588,957 | 3/1952 | Brown .................................... 220/4.24 |
| 4,034,926 | 7/1977 | Wegner .................................. 220/4.24 |
| 4,189,054 | 2/1980 | Liu ......................................... 220/4.23 |
| 4,273,249 | 6/1981 | Florian ................................... 220/4.23 |
| 4,863,054 | 9/1989 | Capetta .................................. 220/4.23 |

FOREIGN PATENT DOCUMENTS 1367931  9/1974  United Kingdom ................... 206/304

*Primary Examiner*—Randall E. Chin
*Attorney, Agent, or Firm*—Rohm & Monsanto, PLC

[57] ABSTRACT

A wheel cleaning cover, such as for a golf trolley wheel, is formed of a pair of hinged circular covers, each forming a semi-circular half and made of a light, robust material. When the golf trolley is not in use, a pair of such wheel covers can be closed around respective ones of the golf trolley's wheels. For each such wheel, the hinged semi-circular halves are securely fastened to one another to encase the associated wheel therewithin. The trolley wheels can remain on their axle(s) while the covers are securely closed around the wheels. When a cover is closed around its associated wheel and secured, it can be rotated and a brush installed in the cover functions as a cleaner/buffer, removing any mud, dirt, or grass on the enclosed wheel's surface. Debris from the wheel is contained within the cover until the cover is removed from the wheel, then any debris may be discarded.

4 Claims, 1 Drawing Sheet

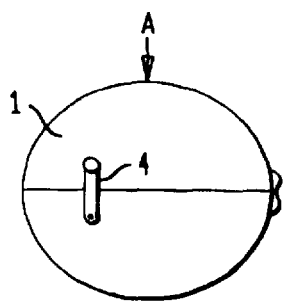
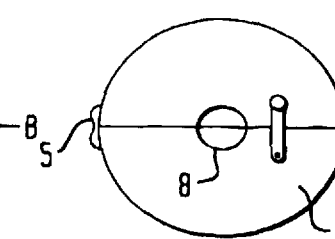
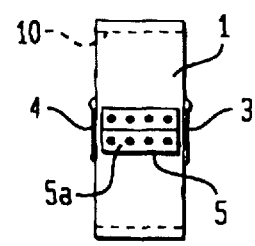
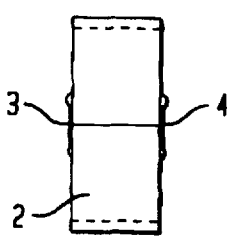
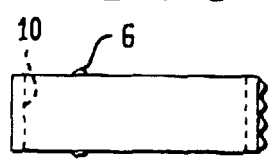
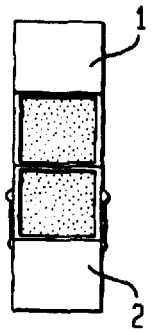
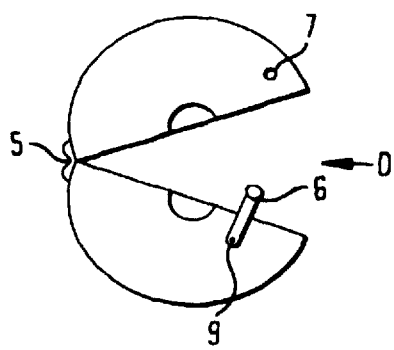
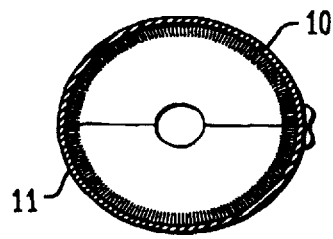
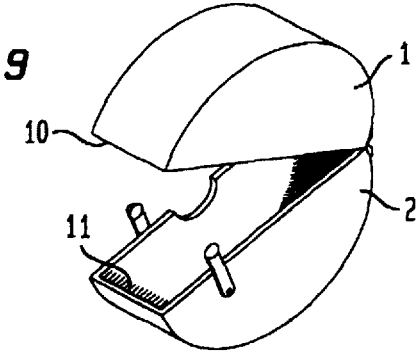

WHEEL CLEANING COVER

BACKGROUND OF THE INVENTION

1. Field of the Invention

This invention relates to golf equipment, and more particularly, to an improved golf trolley or cart.

2. Description of the Prior Art

Golf trolleys are widely used by golfers to assist in carrying their golfing equipment, while on a golf course. During play in winter and more severe weather, golf trolley wheels gather mud and wet grass. This does not affect play, but presents golfers with a problem after completion of their sporting activity. It is not always possible to clean trolley wheels after use. Weather conditions may make this impractical or cleaning facilities may not be available. Often golfers have to put trolleys, with dirty wheels, into vehicle interiors or lockers. This dirt can mark, dampen or damage such areas and upholstery. There is, therefore, a need for a means to prevent golf trolley wheels from soiling their environment.

It is thus an object of the invention to provide a means for preventing soiled golf trolley wheels from coming into contact with upholstery, etc.

It is a further object of the invention to provide a means for cleaning the soiled golf trolley wheels while preventing the soil from contacting clean environments.

SUMMARY OF THE INVENTION

The foregoing and other objects of the invention are achieved by this invention which provides a wheel cleaning cover e.g., a golf trolley wheel cover, which has a body consisting of two parts/halves. When in use, a hinge and straps hold both halves of the body closed. When closed around a golf trolley wheel the wheel cover will:

prevent dirt, mud, wet grass, etc. from soiling or damaging the immediate environment; and when rotated, act as a cleaning aid which brushes off dry dirt, mud, grass, etc. and contains such debris within, until removed after unfastening.

Reference throughout this document, will be to one wheel cover, given that its partner is identical.

BRIEF DESCRIPTION OF THE DRAWING

A special embodiment of the invention will now be described by way of example with reference to the accompanying drawing in which:

FIG. 1 is a front elevation of a closed wheel cover in accordance with the present invention;

FIG. 2 is a rear elevation of the wheel cover of the present invention in a closed condition;

FIG. 3 is a side elevation of the hinge side of the closed wheel cover, corresponding to the view identified by arrow B, in FIG. 1;

FIG. 4 is a side elevation of the closed wheel cover opposite to the hinge side, corresponding to the view identified by arrow C, in FIG. 2;

FIG. 5 is a top plan view of the wheel cover of the present invention, corresponding to the view identified by arrow A, in FIG. 1;

FIG. 6 is a side view of the wheel cover of the present invention in a partially open condition, corresponding to the view identified by arrow D, in FIG. 7;

FIG. 7 is a rear elevation of the wheel cover in a partially open condition;

FIG. 8 illustrates a front view of internal components for cleaning; and

FIG. 9 is an isometrical front view representation of the wheel cover of the present invention in a partially open condition.

DETAILED DESCRIPTION OF THE PREFERRED EMBODIMENT

According to the present invention there is provided a wheel cover comprising two hinged, hollow, semi-circular casings, in the form of a circular cover when closed. This wheel cover, when closed around a wheel will prevent dirt from the wheel from soiling its immediate environment. This wheel cover, with permanently fixed internal components, when closed around a wheel and turned in a clockwise or counterclockwise direction, will act in a brushing and cleaning manner. A typical golf trolley has two wheels, therefore, a pair of these wheel covers would present a complete solution. Each of the pair of wheel covers would be identical.

Referring to the drawings, the wheel cleaning cover, as shown in FIGS. 1–9, is a hollow, openable casing formed from ridged moulded material.

Before opening the casing, straps 3 and 4, as shown in FIG. 3, have to be unclipped to allow opening to take place. Straps 3 and 4 are permanently fixed by an individual stud 9 and fastener 6 clips to stud 7 as shown in FIG. 7. This applies to both sides of the wheel cover.

Due to the hinging on the outer edge, it is possible to open and close the wheel cover, encasing a wheel. The hinge 5 which is fixed by fasteners 5a is shown in FIG. 3.

By opening cover halves 1 and 2 fully, the openable casing can be placed over the golf trolley wheels (not shown) to be covered. The reverse procedure then takes place to close the wheel cover around the wheel, which is then connected and secured inside once the straps are fastened.

Straps 3 and 4 would be fastened when the cover is in use or not being used, to reduce the stowing space required by the cover.

It is also possible to leave the wheel on its axle (not shown) as the elevation in FIG. 2 shows. The smaller diameter cut-out 8 accommodates the axle.

When the wheel cover is in use, covering a wheel and fastened, dirt, mud, wet grass etc. are kept within the wheel cover. Over a period of time such dirt, mud, and grass, etc. would dry out. The internally adhered cleaning brush edges 10 and 11 which are fitted in a semi-circular manner within the casing, when revolved in a circular motion, either clockwise or counterclockwise, the brushes would buff off dirt and grass from the wheel and it would be contained within the casing. When the wheel cover is unfastened and removed from the wheel it is possible for excess dirt to be tapped out of the wheel cover casing or washed out as preferred. Brush edges 10 and 11 also assist in noise reduction by preventing rattle and vibration during transit.

The material used in the construction of this wheel cover would be robust, relatively light, easy to handle synthetic type material. The straps and internal cleaning surfaces would be flexible to allow movement as should be the hinged parts. The wheel cover can be colour co-ordinated in the materials from which it is made.

The overall size of the wheel cover is to have a minimum internal size of 80 mm×240 mm but will be variable to a range of similar sizes. The 240 mm dimension represents a diameter.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

We claim:

1. A cover for a wheel, the cover comprising:

two hollow, semi-circular casings, which, when closed, form a wheel cover around the wheel, the semi-circular casings each having a planar front side and a planar rear side, the front side and the rear side being connected by an annular wall;

means for fastening together securely both semi-circular casings to provide encasement of the wheel therewithin, thereby preventing dirt or grass on the wheel from being released into the environment; and internal cleaning components affixed to an interior surface of the annular walls to cause a cleaning action to be performed on the wheel wherein the cover is rotated in a clockwise or counterclockwise direction relative to the wheel.

2. A cover as claimed in claim 1, wherein both casings can be completely closed circumferentially around the wheel, and wherein the wheel is installed on an axle, the axle being accommodated through an aperture disposed through the planar rear side of each casing.

3. A cover as claimed in claim 2 wherein the internal cleaning components comprise cleaning brush edges.

4. A cover as claimed in claim 1, wherein the cover is adapted to contain debris from the wheel.

* * * * *